US 12,049,296 B2

(12) United States Patent
Bonang et al.

(10) Patent No.: US 12,049,296 B2
(45) Date of Patent: Jul. 30, 2024

(54) PUBLIC TRANSPORTATION VEHICLE WITH MIXED PASSENGER SEATING AND CARGO STORAGE AND ASSOCIATED METHODS

(71) Applicant: The Boeing Company, Chicago, IL (US)

(72) Inventors: James Joseph Bonang, Garden Grove, CA (US); Thomas Stepp, Long Beach, CA (US)

(73) Assignee: The Boeing Company, Arlington, VA (US)

( * ) Notice: Subject to any disclaimer, the term of this patent is extended or adjusted under 35 U.S.C. 154(b) by 79 days.

(21) Appl. No.: 17/718,076

(22) Filed: Apr. 11, 2022

(65) Prior Publication Data

US 2022/0363365 A1 Nov. 17, 2022

Related U.S. Application Data

(60) Provisional application No. 63/187,262, filed on May 11, 2021.

(51) Int. Cl.
*B64D 11/00* (2006.01)
*B64C 1/20* (2006.01)
*B64D 11/06* (2006.01)

(52) U.S. Cl.
CPC ............ *B64C 1/20* (2013.01); *B64D 11/0696* (2013.01); *B64D 2011/0046* (2013.01)

(58) Field of Classification Search
CPC ........ B64D 2011/0046; B64D 11/0627; B64D 11/0007; B64D 11/003; A47B 31/06
See application file for complete search history.

(56) References Cited

U.S. PATENT DOCUMENTS

| 5,090,639 | A | * | 2/1992 | Miller | B64D 9/00 |
| | | | | | 244/137.1 |
| 2006/0243850 | A1 | | 11/2006 | Hartmann et al. | |
| 2016/0244186 | A1 | * | 8/2016 | Brown | B64D 9/00 |
| 2019/0071181 | A1 | * | 3/2019 | Demary | B64D 11/0612 |
| 2019/0352087 | A1 | | 11/2019 | Williams et al. | |
| 2020/0122839 | A1 | * | 4/2020 | Carr | B64D 11/0693 |
| 2020/0376986 | A1 | * | 12/2020 | Line | B60N 2/0155 |
| 2020/0385125 | A1 | * | 12/2020 | Dowty | B64D 11/0639 |
| 2022/0112027 | A1 | * | 4/2022 | Melton | B65D 88/14 |

OTHER PUBLICATIONS

Stephanie Taylor, HAECO Develops Cabin Cargo Solution in Response to COVID-19, Apex, Apr. 20, 2020 (Year: 2020).*
Extended European Search Report for EP Patent Application No. 22155217.7 dated Jul. 22, 2022.

* cited by examiner

*Primary Examiner* — Timothy D Collins
*Assistant Examiner* — Terri L Filosi
(74) *Attorney, Agent, or Firm* — Kunzler Bean & Adamson

(57) ABSTRACT

A public transportation vehicle comprises a passenger cabin, comprising a cabin floor, and a plurality of seating tracks, fixed to the cabin floor at locations along the passenger cabin. The public transportation vehicle further comprises a plurality of passenger seats selectively releasably fixed to at least one seating track of the plurality of seating tracks. The public transportation vehicle additionally comprises at least one cargo cart that is selectively releasably fixable to at least one seating track of the plurality of seating tracks.

20 Claims, 12 Drawing Sheets

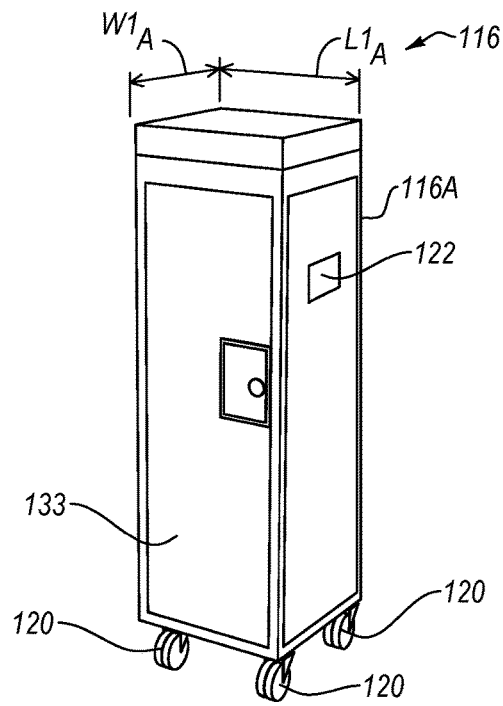
FIG. 1A
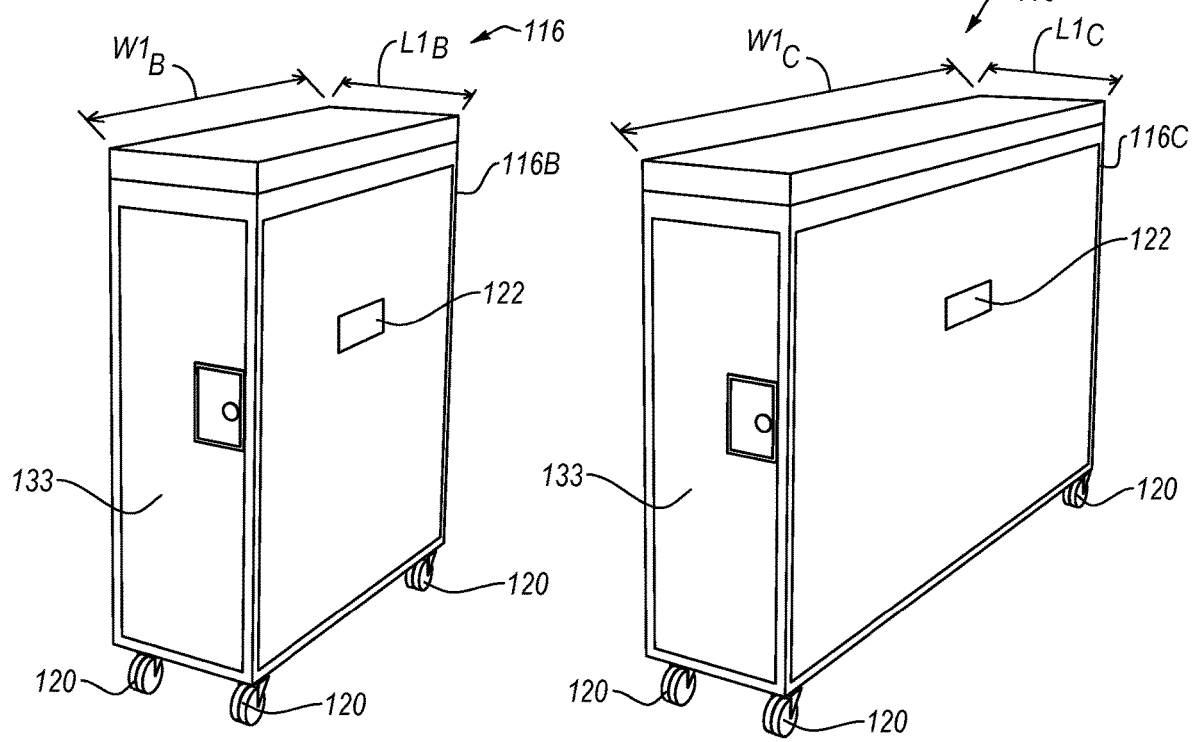
FIG. 1B  FIG. 1C

PUBLIC TRANSPORTATION VEHICLE WITH MIXED PASSENGER SEATING AND CARGO STORAGE AND ASSOCIATED METHODS

FIELD

This disclosure relates generally to a passenger cabin arrangement of a public transportation vehicle, and more particularly to a public transportation vehicle with mixed passenger seating and cargo storage.

BACKGROUND

Typical passenger seats in a public transportation vehicle, such as an aircraft, ferry, bus, train, and the like, are arranged into multiple rows. The passenger seats in each row are directly laterally adjacent to one another. Therefore, any passengers occupying directly laterally adjacent passenger seats are in close proximity to other passengers. For various reasons, passengers in a public transportation vehicle may find it undesirable to be seated immediately adjacent to other passengers on the public transportation vehicle. However, purposefully leaving passenger seats unoccupied, to allow passengers to be distanced from other passengers, can lead to lost revenue for the public transportation vehicle. Additionally, unsold passenger seats within a public transportation vehicle that are not purposely left unoccupied can also result in lost revenue. Maintaining profitability when public transportation vehicles are operating below passenger capacity, whether due to unsold passenger seats or purposely distancing passengers, can be difficult.

SUMMARY

The subject matter of the present application provides examples of a public transportation vehicle and associated methods that overcome the above-discussed shortcomings of prior art techniques. The subject matter of the present application has been developed in response to the present state of the art, and in particular, in response to shortcomings of conventional public transportation vehicles.

Disclosed herein is a public transportation vehicle that comprises a passenger cabin, which comprises a cabin floor that extends, in a longitudinal direction, from a front section of the passenger cabin to a back section of the passenger cabin. The public transportation vehicle also comprises a plurality of seating tracks, fixed to the cabin floor at locations along the passenger cabin. The public transportation vehicle further comprises a plurality of passenger seats, arranged into multiple rows spaced apart in the longitudinal direction. Each passenger seat of the plurality of passenger seats is selectively releasably fixed to at least one seating track of the plurality of seating tracks. Additionally, the public transportation vehicle comprises at least one cargo cart. The at least one cargo cart is selectively releasably fixable to at least one seating track of the plurality of seating tracks. When the at least one cargo cart is selectively releasably fixed to the at least one seating track of the plurality of seating tracks, the at least one cargo cart is at least one of laterally directly adjacent one of the plurality of passenger seats in a lateral direction, perpendicular to the longitudinal direction, to form one of the multiple rows with the at least one of the laterally directly adjacent one of the plurality of passenger seats, or longitudinally directly adjacent one of the plurality of passenger seats in the longitudinal direction, to form a column with the longitudinally directly adjacent one of the plurality of passenger seats. The preceding subject matter of this paragraph characterizes example 1 of the present disclosure.

When the at least one cargo cart is selectively releasably fixed to the at least one seating track of the plurality of seating tracks, the at least one cargo cart is laterally directly adjacent one of the plurality of passenger seats on a first side of the at least one cargo cart and laterally directly adjacent another one of the plurality of passenger seats on a second side of the at least one cargo cart. The first side of the at least one cargo cart is opposite the second side of the at least one cargo cart. The preceding subject matter of this paragraph characterizes example 2 of the present disclosure, wherein example 2 also includes the subject matter according to example 1, above.

Alternatively, when the at least one cargo cart is selectively releasably fixed to the at least one seating track of the plurality of seating tracks, the at least one cargo cart is laterally directly adjacent one of the plurality of passenger seats on a first side of the at least one cargo cart and laterally directly adjacent a cabin wall, of the passenger cabin, on a second side of the at least one cargo cart. The first side of the at least one cargo cart is opposite the second side of the at least one cargo cart. The preceding subject matter of this paragraph characterizes example 3 of the present disclosure, wherein example 3 also includes the subject matter according to example 1, above.

The public transportation vehicle further comprises an open aisle that extends in the longitudinal direction, from the front section of the passenger cabin to the back section of the passenger cabin. The plurality of passenger seats are arranged into multiple rows on each side of the open aisle. When the at least one cargo cart is selectively releasably fixed to the at least one seating track of the plurality of seating tracks, the at least one cargo cart is laterally directly adjacent one of the plurality of passenger seats on a first side of the at least one cargo cart and laterally directly adjacent the open aisle on a second side of the at least one cargo cart. The first side of the at least one cargo cart is opposite the second side of the at least one cargo cart. The preceding subject matter of this paragraph characterizes example 4 of the present disclosure, wherein example 4 also includes the subject matter according to example 1, above.

Alternatively, the public transportation vehicle further comprises an open aisle that extends in the longitudinal direction, from the front section of the passenger cabin to the back section of the passenger cabin. The plurality of passenger seats are arranged into multiple rows on each side of the open aisle. When the at least one cargo cart is selectively releasably fixed to the at least one seating track of the plurality of seating tracks, the at least one cargo cart is laterally directly adjacent a cabin wall on a first side of the cargo cart and laterally directly adjacent the open aisle on a second side of the at least one cargo cart. The first side of the at least one cargo cart is opposite the second side of the at least one cargo cart. The preceding subject matter of this paragraph characterizes example 5 of the present disclosure, wherein example 5 also includes the subject matter according to example 1, above.

When the at least one cargo cart is selectively releasably fixed to the at least one seating track of the plurality of seating tracks, the at least one cargo cart is longitudinally directly adjacent one of the plurality of passenger seats in the longitudinal direction, and the at least one cargo cart extends from a first one of the multiple rows to a second one of the multiple rows that is longitudinally directly adjacent the first one of the multiple rows. The preceding subject matter of this paragraph characterizes example 6 of the present disclosure, wherein example 6 also includes the subject matter according to example 1, above.

The at least one cargo cart has a first width, in the lateral direction, when the cargo cart is selectively releasably fixed to the at least one seating track. Each passenger seat of the plurality of passenger seats has a second width in the lateral direction. The first width is the same as or less than the second width. The preceding subject matter of this paragraph characterizes example 7 of the present disclosure, wherein example 7 also includes the subject matter according to any one of examples 1-6, above.

Alternatively, the at least one cargo cart has a first width, in the lateral direction, when the cargo cart is selectively releasably fixed to the at least one seating track. Each passenger seat of the plurality of passenger seats has a second width in the lateral direction. The first width is greater than the second width. The preceding subject matter of this paragraph characterizes example 8 of the present disclosure, wherein example 8 also includes the subject matter according to any one of examples 1-6, above.

The at least one cargo cart has a first length, in the longitudinal direction, when the cargo cart is selectively releasably fixed to the at least one seating track. Each passenger seat of the plurality of passenger seats has a second length in the longitudinal direction. The first length is the same or less than the second length. The preceding subject matter of this paragraph characterizes example 9 of the present disclosure, wherein example 9 also includes the subject matter according to any one of examples 1-8, above.

Alternatively, the at least one cargo cart has a first length, in the longitudinal direction, when the cargo cart is selectively releasably fixed to the at least one seating track. Each passenger seat of the plurality of passenger seats has a second length in the longitudinal direction. The first length is greater than the second length, such that the at least one cargo cart extends from a first one of the multiple rows into a second one of the multiple rows that is longitudinally directly adjacent the first one of the multiple rows. The preceding subject matter of this paragraph characterizes example 10 of the present disclosure, wherein example 10 also includes the subject matter according to example 1, above.

The public transportation vehicle further comprises a plurality of cargo carts. Each cargo cart of the plurality of cargo carts is selectively releasably fixable to at least one seating track of the plurality of seating tracks. When each one of the cargo carts is selectively releasably fixed to the at least one seating track of the plurality of seating tracks, each one of the cargo carts is at least one of laterally directly adjacent one of the plurality of passenger seats in the lateral direction, perpendicular to the longitudinal direction, to form one of the multiple rows with the at least one of the laterally directly adjacent one of the plurality of passenger seats, or longitudinally directly adjacent one of the plurality of passenger seats in the longitudinal direction, to form the column with the longitudinally directly adjacent one of the plurality of passenger seats. The preceding subject matter of this paragraph characterizes example 11 of the present disclosure, wherein example 11 also includes the subject matter according to any one of examples 1-10, above.

At least one of the cargo carts of the plurality of cargo carts has a first size. At least another one of the cargo carts of the plurality of cargo carts has a second size. The first size is different than the second size. The preceding subject matter of this paragraph characterizes example 12 of the present disclosure, wherein example 12 also includes the subject matter according to example 11, above.

At least one of the cargo carts of the plurality of cargo carts has a third size. The third size is different than the first size and the second size. The preceding subject matter of this paragraph characterizes example 13 of the present disclosure, wherein example 13 also includes the subject matter according to example 12, above.

The at least one cargo cart further comprises rollers attached to an underside of the at least one cargo cart. The rollers are rollable along the cabin floor. The at least one cargo cart also comprises an interior compartment configured to conceal cargo items. The at least one cargo cart additionally comprises a door, movably coupled relative to the interior compartment. The door is openable to provide access to the interior compartment and closable to restrict access to the interior compartment. The preceding subject matter of this paragraph characterizes example 14 of the present disclosure, wherein example 14 also includes the subject matter according to any one of examples 1-13, above.

The public transportation vehicle further comprises at least one wall partition, pivotably fixable relative to the cabin floor. The at least one wall partition extends vertical upwardly perpendicular to the cabin floor. When the at least one wall partition is pivotably fixed relative to the cabin floor, the at least one wall partition is laterally directly adjacent to one side of the at least one cargo cart and interposed between the at least one cargo cart and at least one of an open aisle that is laterally directly adjacent the at least one cargo cart or one of the plurality of passenger seats that is laterally directly adjacent the at least one cargo cart. The preceding subject matter of this paragraph characterizes example 15 of the present disclosure, wherein example 15 also includes the subject matter according to any one of examples 1-14, above.

Further disclosed herein is a method of occupying a passenger cabin of a public transportation vehicle with mixed passenger seating and cargo storage. The method comprises securing a plurality of passenger seats to seating tracks fixed to a cabin floor of the passenger cabin. The plurality of passenger seats are arranged into at least some rows of multiple rows of the passenger cabin spaced apart in a longitudinal direction from a front section to a back section of the passenger cabin. At least one row of the multiple rows comprises an open space through which at least one of the seating tracks extends. The method also comprises moving at least one cargo cart into the open space, such that the at least one cargo cart is at least one of laterally directly adjacent one of the plurality of passenger seats in a lateral direction, perpendicular to the longitudinal direction, to form one of the multiple rows with the laterally directly adjacent one of the plurality of passenger seats or longitudinally directly adjacent one of the plurality of passenger seats in the longitudinal direction, to form a column with the longitudinally directly adjacent one of the plurality of passenger seats. The method further comprises releasably securing the at least one cargo cart to the at least one of the seating tracks that extends through the open space. The preceding subject matter of this paragraph characterizes example 16 of the present disclosure.

The method further comprises releasably securing secondary attachment portions on the at least one cargo cart to corresponding attachment portions in a laterally directly adjacent vertical surface. The vertical surface extends upwardly from the cabin floor. The preceding subject matter of this paragraph characterizes example 17 of the present disclosure, wherein example 17 also includes the subject matter according to example 16, above.

Additionally, disclosed herein is a method of optimizing loading of a passenger cabin of a public transportation vehicle with mixed passenger seating and cargo storage. The method comprises determining an optimized loading order of passengers and a plurality of cargo carts into the passenger cabin. The optimized loading order comprises loading a first cargo cart of a plurality of cargo carts before loading a second cargo cart of the plurality of cargo carts based on at least one of a size, weight, shape, or delivery location of the first cargo cart relative to the second cargo cart. The method also comprises advancing the first cargo cart of a plurality of cargo carts into a corresponding first one of a plurality of open spaces within multiple rows of the passenger cabin, spaced apart in a longitudinal direction along a cabin floor of the passenger cabin, at least some rows of the multiple rows comprising a plurality of passenger seats. Each open space of the plurality of open spaces is at least one of laterally directly adjacent one of the plurality of passenger seats in a lateral direction, perpendicular to the longitudinal direction, to form one of the multiple rows with the laterally directly adjacent one of the plurality of passenger seats or longitudinally directly adjacent one of the plurality of passenger seats in the longitudinal direction, to form a column with the longitudinally directly adjacent one of the plurality of passenger seats. The method further comprises advancing the second cargo cart of the plurality of cargo carts into a corresponding second one of the plurality of open spaces after advancing the first cargo cart into the corresponding first one of the plurality of open spaces. The preceding subject matter of this paragraph characterizes example 18 of the present disclosure.

The method further comprises releasably securing the first cargo cart to at least one of a plurality of seating tracks that extends through the corresponding first one of the plurality of open spaces, the plurality of seating tracks fixed to the cabin floor of the passenger cabin. The method additionally comprises releasably securing the second cargo cart to at least one of the seating tracks that extends through the corresponding second one of the plurality of open spaces. The preceding subject matter of this paragraph characterizes example 19 of the present disclosure, wherein example 19 also includes the subject matter according to example 18, above.

The method further comprises arranging each cargo cart of the plurality of cargo carts in an order, corresponding with the optimized loading order of passengers and the plurality of cargo carts into the passenger cabin, prior to advancing any one of the plurality of cargo carts into the passenger cabin. The preceding subject matter of this paragraph characterizes example 20 of the present disclosure, wherein example 20 also includes the subject matter according to any one of examples 18-19, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which:

FIG. 1A is a schematic perspective view of a cargo cart for a public transportation vehicle, where the cargo cart has a first size, according to one or more examples of the present disclosure;

FIG. 1B is a schematic perspective view of a cargo cart for a public transportation vehicle, where the cargo cart has a second size, according to one or more examples of the present disclosure;

FIG. 1C is a schematic perspective view of a cargo cart for a public transportation vehicle, where the cargo cart has a third size, according to one or more examples of the present disclosure;

DETAILED DESCRIPTION

Figure 2:
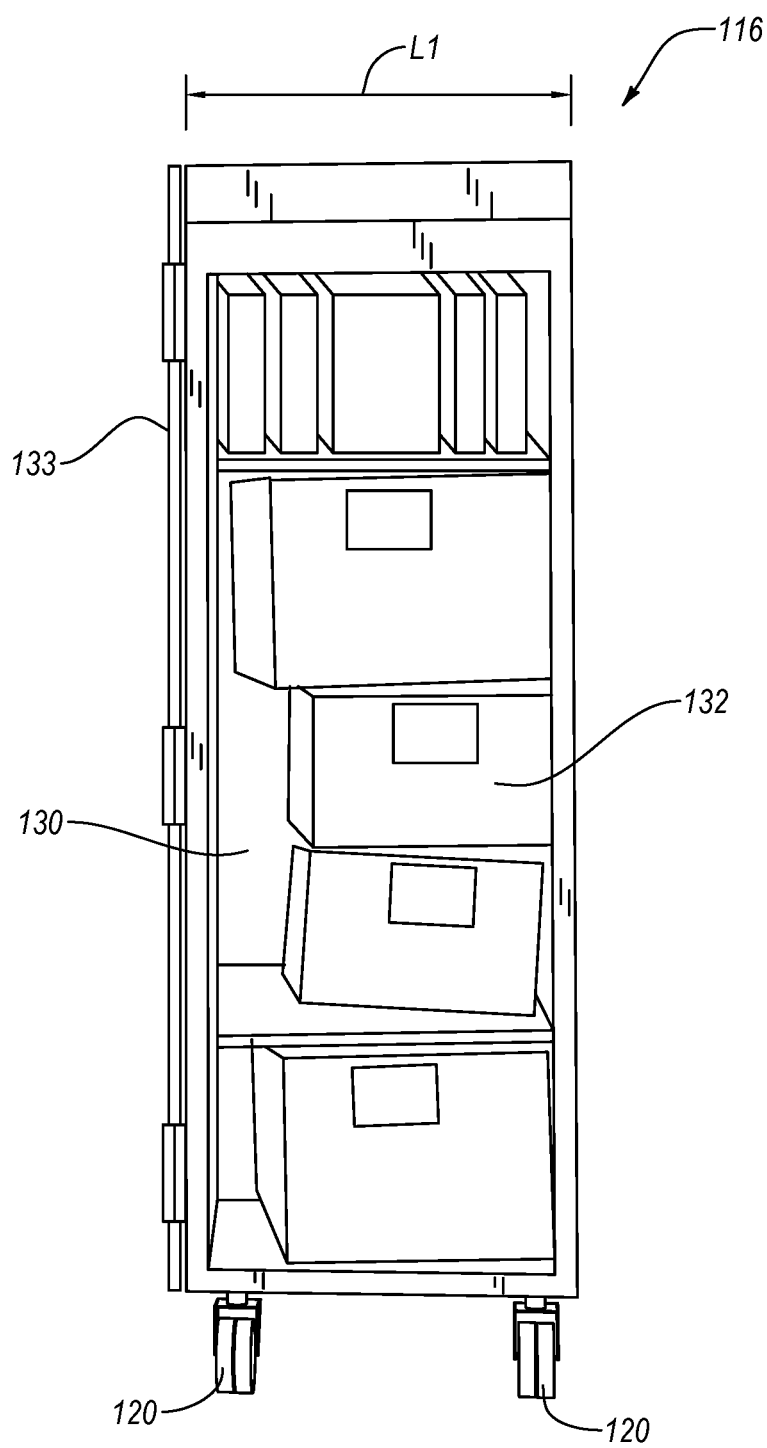
FIG. 2 is a schematic perspective view of a cargo cart for a public transportation vehicle, where the cargo cart has an interior compartment with cargo items within the interior compartment, according to one or more examples of the present disclosure.

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Disclosed herein is a public transportation vehicle and associated methods of occupying the public transportation vehicle and optimizing the loading of the public transportation vehicle. The public transportation vehicle comprises a passenger cabin with a plurality of seating tracks fixed to a cabin floor of the passenger cabin. A plurality of passenger seats and at least one cargo cart are selectively releasably fixable to the seating tracks. The passenger seats and the cargo cart(s) are arranged into multiple rows in the passenger cabin when the passenger seats and the cargo cart(s) are selectively releasably fixed to the seating tracks. The cargo cart(s), when fixed within the passenger cabin, is at least one of laterally directly adjacent one of the passenger seats in a lateral direction or longitudinally directly adjacent one of the passenger seats in the longitudinal direction. Accordingly, the public transportation vehicle is configured for mixed passenger seating and cargo storage within the passenger cabin of the public transportation vehicle with the cargo storage either laterally directly adjacent or longitudinally directly adjacent to at least one passenger seat.

Cargo carts can be added within the rows of passenger seating in the passenger cabin for many reasons. One reason is to help meet profitability demands of the public transportation vehicle. Another reason is to improve customer expectations or to address requests, such as maintaining a physical distance between passengers or groups of passengers or providing additional passenger cargo storage for nearby passengers. In one example, the public transportation vehicle can be arranged to isolate a passenger or a group of passengers (i.e., a social or family unit) from other passengers, with the cargo carts being placed intentionally within the passenger cabin to separate passenger seats or groups of passenger seats. In other examples, any unsold passenger seats within the public transportation vehicle may be removed and replaced with a cargo cart.

The cargo carts can be pre-filled (i.e., filled before entering the public transportation vehicle), post-filled (i.e., filled after entering the public transportation vehicle) with cargo items, or may be empty. The cargo items with the cargo carts may belong to passengers on the public transportation vehicle. Alternatively, outside or third-party shipping providers, may transport cargo items within the cargo carts for which the public transportation vehicle may charge a fee to transport.

The public transportation vehicle may charge a premium transportation fee to transport high-value or expedited cargo items. In some cases, the transportation fee for transporting cargo items within the cargo carts may bring in more revenue than a fee paid by a passenger(s) that would otherwise occupy the space used for the cargo cart. Accordingly, in some cases, the public transportation vehicle can travel profitably while allowing passengers to be distanced from other passengers, such as being social distanced from passengers in other social or family units, by separating passenger seats or groups of passenger seats from other passenger seats with cargo carts. Additionally, the cargo carts allow otherwise unoccupied passenger seats within the public transportation vehicle to be replaced with cargo carts that may add additional revenue to the public transportation vehicle. The public transportation vehicle may be one of a bus, rail or train system, watercraft (e.g., ferry), or aircraft. As used herein, the public transportation vehicle will be described in the context of an aircraft, however, it should be understood that the mixed cargo storage and passenger seating disclosed herein could be used in any public transportation vehicle.

Referring to FIGS. 1A-1C, and according to some examples, cargo carts 116 having different sizes (e.g., shapes) is shown. The cargo cart 116 is configured to be interspersed within rows of passenger seats in a public transportation vehicle. As such, the cargo cart 116 has a shape and size that allows the cargo cart 116 to be moved within a public transportation vehicle, as well as, to be selectively and releasably fixed within a row in the public transportation vehicle. As shown in FIG. 1A, the cargo cart 116 can be a first cargo cart 116A that has a first size (e.g., first shape). The first cargo cart 116A has a first length $L1_A$ and a first width $W1_A$. In some examples, the first length $L1_A$ is equal to the first width $W1_A$, such that the cargo cart 116A has a square shape. In other examples, the first length $L1_A$ is either less than or greater than (i.e., not equal to) the first width $W1_A$, such that the cargo cart 116A is rectangularly shaped. As shown in FIG. 1B, the cargo cart 116 can be a second cargo cart 116B that has a second size (e.g., second shape). The second size of the second cargo cart 116B is different than the first size of the first cargo cart 116A. In the illustrated example, the second cargo cart 116B has a first length $L1_B$ and a first width $W1_B$. The first width $W1_B$ is greater than the first length $L1_B$ such that the cargo cart 116B is rectangularly shaped. As shown in FIG. 1C, the cargo cart 116 can be a third cargo cart 116C that has a third size (e.g., third shape). The third size of the third cargo cart 116C is different than the first size of the first cargo cart 116A and the second size of the second cargo cart 116B. The third cargo cart 116B has a first length $L1_C$ and a first width $W1_C$. The first width $W1_C$ is greater than the first length $L1_C$ such that the cargo cart 116C is rectangularly shaped.

Although the cargo cart 116 can have a variety of shapes and sizes, including but not limited to the shape and sizes of the first cargo cart 116A, the second cargo cart 116B, and the third cargo cart 116C, the size and shape of the cargo cart 116 is generally correlated to a size or a factor of the size of the passenger seat within the public transportation vehicle, such as a single passenger seat or a factor of the passenger seat (i.e., multiple passenger seats). For example, a cargo cart 116 may occupy the space (e.g., footprint) of a single passenger seat, two passenger seats, three passenger seats, an entire row of passenger seats, etc. In one example, the first cargo cart 116A may be sized to fit within the space of one passenger seat, such that the first length $L1_A$ would be equal to or less than the length of one passenger seat and the first width $W1_A$ would be equal to or less than the width of one passenger seat. In certain examples, the cargo cart 116B may be sized to fit within the space of two laterally or longitudinally directly adjacent passenger seats. For example, the first width $W1_B$ is greater than (e.g., up to two-times greater than) the width of one passenger seat and the first length $L1_B$ is be equal to or less than the length of one passenger seat. In some examples, the third cargo cart 116C may be sized to fit within the space of three laterally or longitudinally directly adjacent passenger seats. For examples, the first width $W1_C$ is greater than (e.g., up to three-times greater than) the width of one passenger seat and the first length L1c is equal or less than the length of one passenger seat.

Regardless of the size of the cargo cart 116, the cargo cart 116 is configured to be selectively movable or fixable relative to a surface on which the cargo cart 116 is supported. Accordingly, the cargo cart 116 may be moved to and fixed at a location within the passenger cabin of a public transportation vehicle. In some examples, the cargo cart 116 has rollers 120 attached to an underside of the cargo cart 116. The rollers 120 may include as many rollers attached to the underside of the cargo cart 116 as necessary to move the cargo cart 116, such as a roller attached at each corner of the cargo cart 116. The rollers 120 may be any design that allows the cargo cart 116 to move along a surface, such as wheels, casters, spinners, etc. The rollers 120 allow the cargo cart 116 to move along a surface, such as a tarmac, jet bridge, or the cabin floor in the passenger cabin. Additionally, the rollers 120 allow the cargo cart 116 to be moved and positioned within the desired open space within the passenger seats. As such, the rollers 120 may allow the cargo cart 116 to maneuver easily in tight areas, such as an open aisle or between longitudinal rows of passenger seats. In some examples, at least one of the rollers 120 may have a lock that can be used to prevent the roller 120 from rotating and therefore prevent the cargo cart 116 from moving along the surface, when the roller 120 is locked. Additionally, in some examples, the rollers 120 are configured to be selectively and releasably fixable to a seating track. In other examples, the cargo cart 116 is selectively and releasably fixable to a seating track by means other than the rollers 120. The rollers may be removable, or retractable and/or foldable to be stored on an underside of the cargo cart 116.

In some examples, the cargo cart 116 includes secondary attachment portions 122. The secondary attachment portions 122 are configured to correspond with attachment locations in a laterally directly adjacent vertical surface in the passenger cabin. The vertical surface extends upwardly from a cabin floor and may include, but is not limited to, a passenger seat, a cabin wall, another cargo cart, a wall partition, or other like fixed or movable part of the transportation vehicle. In some examples, the cargo cart 116 includes multiple secondary attachment portions 122, such as a secondary attachment portion 122 on a first side of the cargo cart 116 and another secondary attachment portion 122 on a second side of the cargo cart 116, where the second side of the cargo cart 116 is opposite of the first side of the cargo cart 116. Accordingly, the cargo cart may have two secondary attachment portions 122 on opposite sides of the cargo cart 116 that are configured to be removably attached to attachment locations in laterally directly adjacent vertical surfaces on each side of the cargo cart 116. In this manner, when the cargo cart 116 is releasably fixed to a seating track within a public transportation vehicle, the secondary attachment portion 122 can be attached to a corresponding attachment location and provide additional stability to the cargo cart 116.

The cargo cart 116 includes at least one door 133. The door 133 is movably coupled to the cargo cart 116 and is openable to provide access to an interior compartment of the cargo cart 116 and closable to restrict access to the interior compartment (see, e.g., FIG. 2). The door 133 can be any design that allows access to and restriction from the interior compartment. In one example, the door 133 is a swing door that is hinged to the cargo cart 116 on one side of the door. The door, having a single panel, can swing outwardly open, relative to the cargo cart 116. In other examples, the door 133 is made of multiple panels that, when opened, slide inwardly along the top interior surface of the cargo cart 116. In yet another example, the door 133 is made of multiple panels that, when opened, roll up or coiling over each other for compact storage of the door 133 near the top surface of the cargo cart 116. The cargo cart 116 and door 133, when closed, may be watertight, such that the cargo cart 116 can be cleaned and/or sanitized without causing water damage or other damage to the cargo cart 116. In some cases, the cargo cart 116 may be sanitized using sanitation systems available to the public transportation vehicle, such as a washer/disinfector used for catering carts for use in aircrafts.

As shown in FIG. 2, the cargo cart 116 has an interior compartment 130 that is configured to conceal cargo items 132 with the interior compartment 130. As shown, the door 133 has been opened to allow access to the interior compartment 130. The door 133 is along the width W1 side of the cargo cart 116, but in some examples, the door 133 may be along the length L1 side of the cargo cart 116. The cargo cart 116 may be used to store a variety of cargo items, and may be pre-filled with cargo items 132 or post-filled with cargo items 132. In some examples, cargo items 132 include cargo being transported for the passengers on the public transportation vehicle, such as passenger luggage or personal items. In other examples, cargo items 132 include cargo being transported for third-party shipping providers. Such cargo can include various items, such as letters, packages or other freight. The cargo items 132 may be packed within the cargo cart 116 by an employee of the public transportation vehicle, or in other cases, may be packed by an employee of the shipping provider who is shipping the cargo items 132. In some examples, the packing of the cargo items 132 is optimized, such that cargo items 132 within a cargo cart 116 have similar delivery destinations. Furthermore, in some examples, the cargo carts 116, after being transported by the public transportation vehicle, may be used by the shipping provider to deliver cargo items 132, within the cargo cart 116, to the addresses of intended recipients, such as via dedicated transportation vehicles (e.g., delivery vans or trucks).

Figure 3:
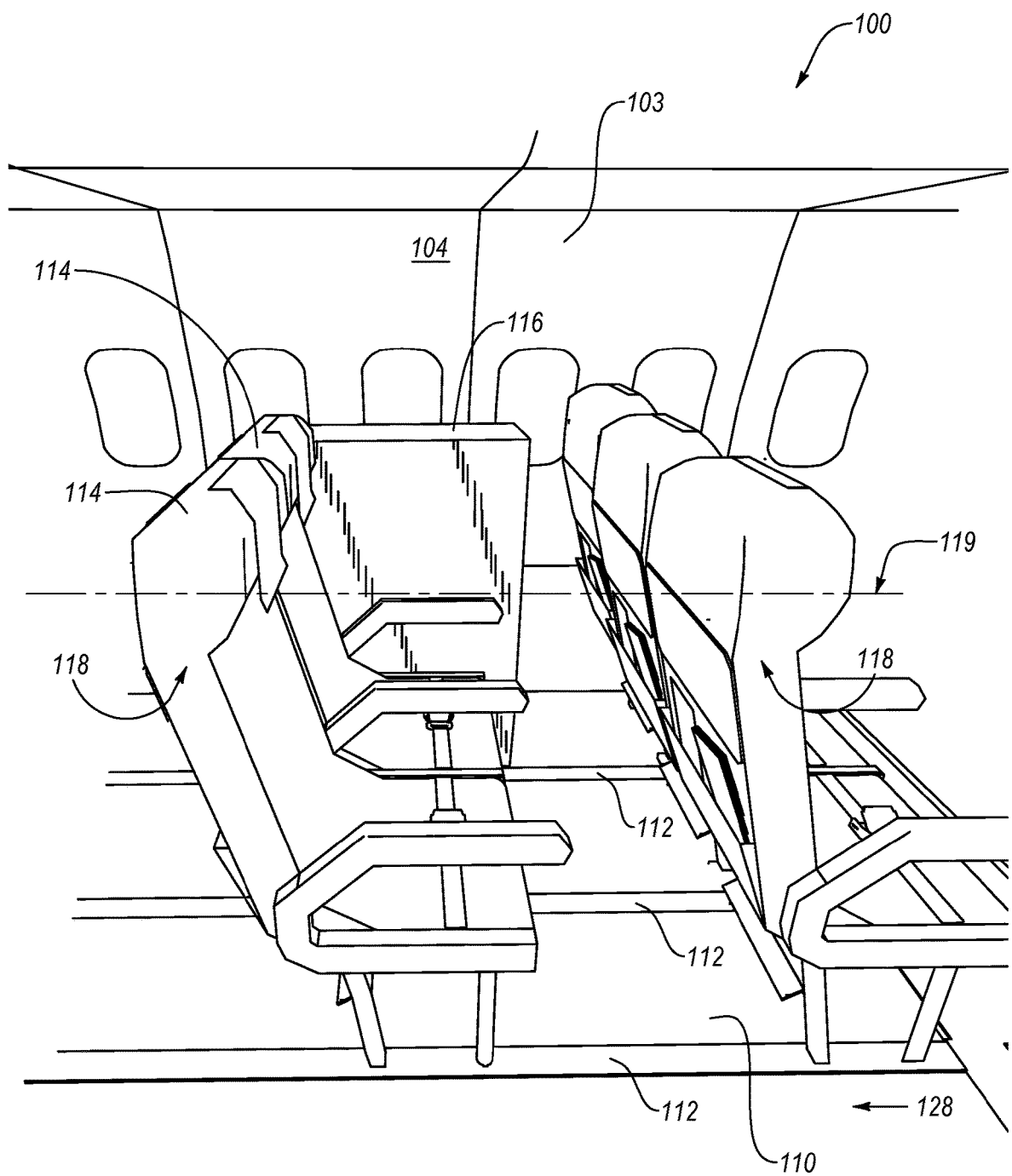
FIG. 3 is a schematic perspective view of a partial section of a passenger cabin of a public transportation vehicle, according to one or more examples of the present disclosure.

Referring to FIG. 3, a partial section of a passenger cabin 104 within a public transportation vehicle 100, is shown. The passenger cabin 104 includes a cabin floor 110 that extends, in a longitudinal direction 105, from a front section of the passenger cabin 104 to a back section of the passenger cabin 104 (see, e.g., FIG. 5). A plurality of seating tracks 112 are fixed to the cabin floor 110. As shown, the seating tracks 112 extend, parallel to each other, in the longitudinal direction 105 along the cabin floor 110 of the passenger cabin 104 and be spaced apart in a lateral direction 107, perpendicular to the longitudinal direction 105. However, in other examples, the seating tracks 112 may extend in a lateral direction 107 along the cabin floor 110 of the passenger cabin 104 and be spaced apart from each other in the longitudinal direction 105. A plurality of passenger seats 114 are arranged into multiple rows 118 spaced apart in the longitudinal direction 105. Each passenger seat 114 is selectively releasably fixed to at least one seating track 112. Moreover, in the illustrated examples, one cargo cart 116 is selectively and releasably fixed to at least one seating track 112 and within one row of the multiple rows 118. The cargo cart 116 is laterally directly adjacent to a passenger seat 114 in the lateral direction 107 to form, along with the passenger seat 114, one of the multiple rows 118. Accordingly, the resulting row 118, which is just one half of the row or the half of the row on one side of the aisle, has two passenger seats 114 and one cargo cart 116. In the illustrated example in FIG. 3, the cargo cart 116 is between one passenger seat 114 and a cabin wall 103. Additionally, the cargo cart 116 is longitudinally directly adjacent one passenger seat 114 in a row ahead of the cargo cart 116 to form a column 119 with the longitudinally directly adjacent passenger seat 114.

A cargo cart 116, when selectively releasably fixed to at least one seating track 112, can be located at any location within a row 118. In one example, the cargo cart 116 is laterally directly adjacent to one passenger seat 114 on a first side of the cargo cart 116 and laterally directly adjacent to another passenger seat 114 on a second side of the cargo cart 116, which is opposite of the first side. Accordingly, the cargo cart 116 is between two passenger seats 114 in the same row. In another example, the cargo cart 116 is laterally directly adjacent to a passenger seat 114 on a first side of the cargo cart 116 and laterally directly adjacent to a cabin wall 103 of the passenger cabin 104, on a second side of the cargo cart 116, the first side opposite of the second side. Accordingly, the cargo cart 116 is located between the cabin wall 103 and a passenger seat 114, as is shown in FIG. 3. In yet another example, the cargo cart 116 is laterally directly adjacent to a passenger seat 114 on a first side of the cargo cart 116 and laterally directly adjacent to an open aisle 128 on a second side of the cargo cart 116, the second side opposite of the first side. Accordingly, the cargo cart 116 is between a passenger seat 114 and the open aisle 128. In other examples, the cargo cart 116 is laterally directly adjacent to a cabin wall 103 on a first side of the cargo cart 116 and laterally directly adjacent to the open aisle 128 on the second side of the cargo cart 116. Accordingly, the cargo cart 116 is not laterally directly adjacent to any passenger seats within a row, but rather between the cabin wall 103 and the open aisle 128 to individually form the entire portion of the row on one side of the open aisle 128.

Alternatively, the cargo cart 116 can be within more than one row 118 in the passenger cabin 104. For example, the cargo cart 116 may be longitudinally span from one row to another adjacent row. In such an example, the cargo cart 116 can be directly adjacent to a passenger seat 114 in the longitudinal direction 105 and extends from a first one of multiple rows 118 to a second one of multiple rows 118 that is longitudinally directly adjacent the first one of the multiple rows 118.

Figure 4A:
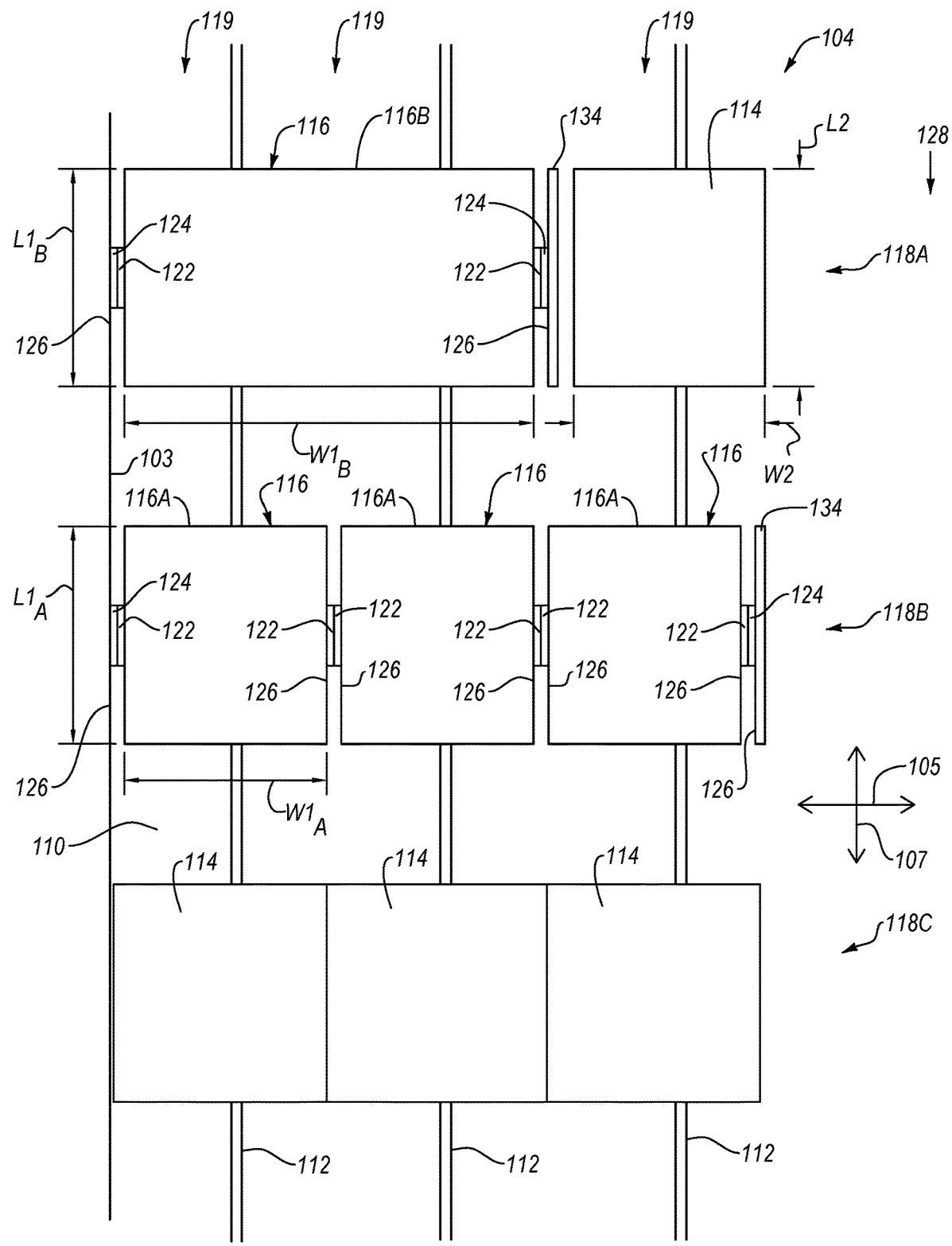
FIG. 4A is a schematic top view of a partial section of a passenger cabin of a public transportation vehicle, according to one or more examples of the present disclosure.

Referring to FIG. 4A, a schematic top view of an example of a partial section of a passenger cabin 104, of a public transportation vehicle 100, is shown. The passenger cabin 104 includes a plurality of passenger seats 114 and a plurality of cargo carts 116. A plurality of seating tracks 112 extends along the cabin floor 110 of the passenger cabin 104 beneath the passenger seats 114 and the cargo carts 116. The plurality of seating tracks 112 may extend in a longitudinal direction 105 from the front section 106 to the back section 108 of the passenger cabin (see, e.g., FIG. 5). Alternatively, the plurality of seating tracks 112 may extend in a lateral direction 107 with each one of the seating tracks 112 corresponding with one of the rows 118. In some examples, one seating track 112 will correspond with each longitudinal column 119 or lateral row 118 in the passenger cabin 104, such as the three seating tracks 112 for three longitudinal columns 119 shown in FIG. 4. However, in other examples, less than one seating track 112 will correspond with each longitudinal column 119 or lateral row 118 in the passenger cabin 104, such as two seating tracks 112 for three longitudinal columns 119 (e.g., a group of three passenger seats 114 and/or cargo carts 116 are fixed to two seating tracks 112). In yet other examples, more than one seating track 112 corresponds with each longitudinal column 119 or lateral row 118 in the passenger cabin 104, such that each passenger seat 114 and/or cargo cart 116 is fixed to more than one seating track 112.

The passenger seats 114 and/or cargo carts 116 are arranged into rows 118 of directly laterally adjacent passenger seats 114 and/or cargo carts 116. A row 118 can have any number of passenger seats 114 and/or cargo carts 116. However, the number of passenger seats 114 and/or cargo carts 116 is limited in each row by the width, in the lateral direction 107, of the passenger cabin 104 of the public transportation vehicle 100. In one example, a row has between 1 to 10 passenger seats 114 and/or cargo carts 116. In another example, a row has between 2 to 10 passenger seats 114 and/or cargo carts 116 with at least one open aisle 128 extending in the longitudinal direction 105 between passenger seats 114 and/or cargo carts 116 in the row 118.

Each row 118 of the passenger cabin 114 can have a variety of combinations of passenger seats 114 and/or cargo carts 116 depending on the needs of the public transportation vehicle 100. For example, row 118A includes both a passenger seat 114 and a cargo cart 116. The cargo cart 116 is a second cargo cart 116B, as shown in FIG. 1B. The width $W1_B$ of the second cargo cart 116B is greater than the width W2 of the passenger seat 114, such that the width $W1_B$ is equal to or less than the width W2 of two passenger seats. The length $L1_B$ of the second cargo cart 116B is equal to or less than the length L2 of the passenger seat 114. Accordingly, the second cargo cart 116B fits within the space that could otherwise be occupied by two passenger seats 114. In other examples, row 118B includes three cargo carts 116. The cargo carts 116 is a first cargo cart 116A, as shown in FIG. 1A. The length $L1_A$ of the first cargo cart 116A is equal to or less than the length L2 of one passenger seat 114. Additionally, the width $W1_A$ is equal to or less than the width W2 of one passenger seat 114. Accordingly, the first cargo cart 116A fits within the space that could otherwise be occupied by one passenger seat 114. In yet another examples, row 118C includes three passenger seats 114, as would typically be within a row 118 on a public transportation vehicle 100.

In some examples, a wall partition 134 may be fixable (e.g., pivotably fixable) relative to the cabin floor 110. The wall partition 134 extends upwardly perpendicular to the cabin floor 110 and may be utilized to visually obscure at least of portion of a side of a cargo carts 116 from laterally directly adjacent locations, such as a passenger seat 114 or open aisle 128. For example, the wall partition 134 in row 118A is laterally directly adjacent to one side of the cargo cart 116B and interposed between the cargo cart 116B and a passenger seat 114 that is laterally directly adjacent to the cargo cart 116B. The wall partition 134 may have a height that is at least as tall as the height of the cargo cart 116B. Accordingly, the wall partition 134, at least partially, visually obscures the side of the cargo cart 116B that is laterally directly adjacent to the wall partition 134 from any passenger sitting in the laterally directly adjacent passenger seat 114. In other examples, such as in row 118B, the wall partition 134 is interposed between the cargo cart 116A that is laterally directly adjacent to the wall partition and the open aisle 128. Accordingly, the wall partition 134, at least partially, visually obscures the side of the cargo cart 116A that is laterally directly adjacent to the wall partition 134. Additionally, or alternatively, in other examples, wall partitions 134 may be placed before and/or behind, in the longitudinal direction 105, the cargo cart 116 in order to, at least partially, visually obscure sides of the cargo cart 116.

The cargo carts 116A and 116B include at least one secondary attachment portion 122. The secondary attachment portions 122 are located at a position on the longitudinal sides of the cargo carts 116A and 116B. The secondary attachment portions 122 corresponding with attachment locations 124 in laterally directly adjacent vertical surfaces 126. For example, in row 118A the cargo cart 116B has a secondary attachment portion 122 that corresponding with an attachment location 124 on the cabin wall 103 and another secondary attachment portion 122 that corresponds with an attachment location 124 on the wall partition 134. In such an example, each one of the cabin wall 103 and the wall partition 134 acts as a vertical surface 126. In other examples, such as the cargo carts 116A in row 118B, the corresponding vertical surface 126 may be another cargo cart 116A. The secondary attachment portions 122 may releasably secure to corresponding attachment portions 124 using any method known in the art, such as a tie down or buckling system. The secondary attachment portions 122 can be attached to corresponding attachment locations 124 to provide additional stability to the cargo carts 116 with the public transportation vehicle 100.

Figure 4B:
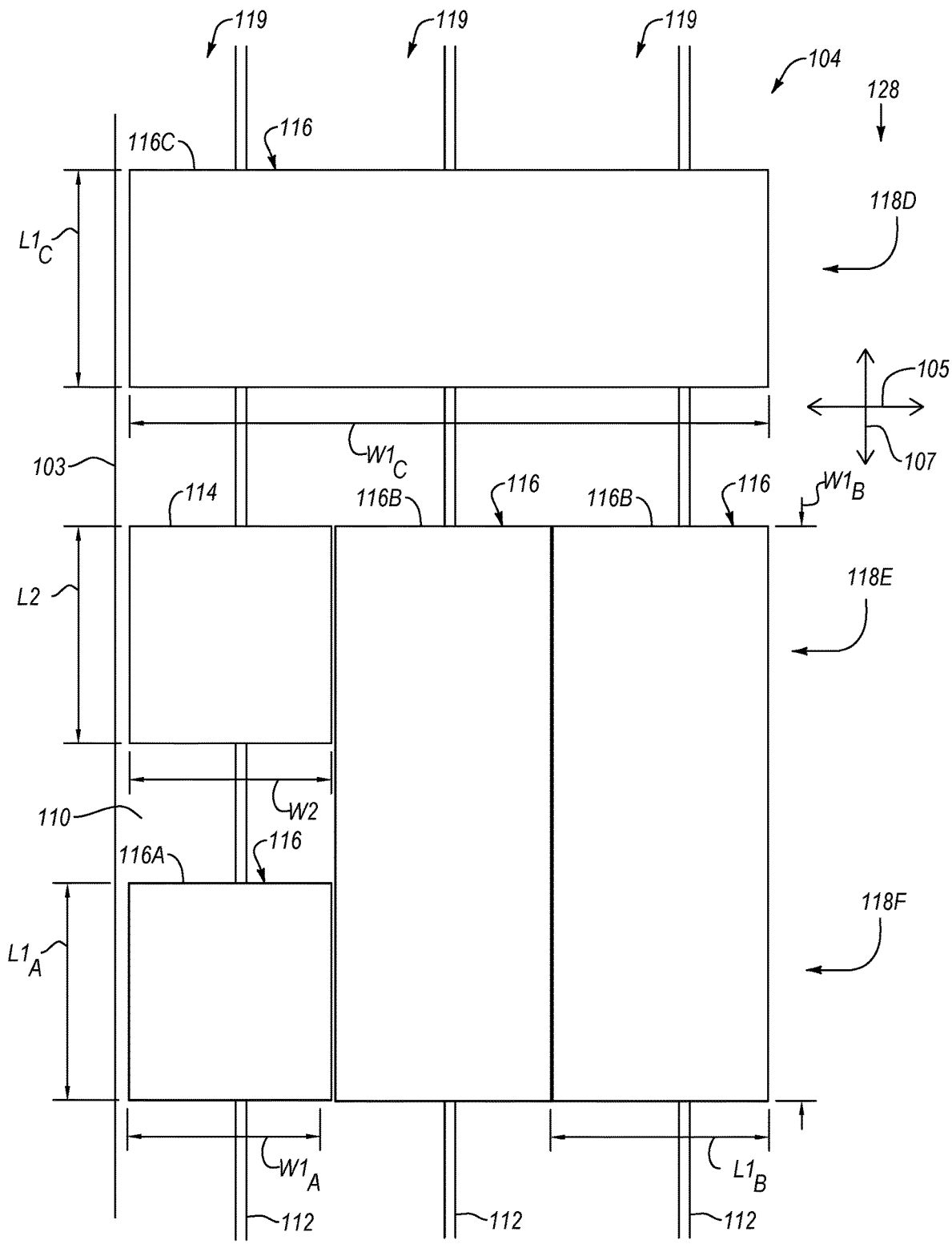
FIG. 4B is a schematic top view of a partial section of a passenger cabin of a public transportation vehicle, according to one or more examples of the present disclosure.

Referring to FIG. 4B, a schematic top view of another example of a partial section of a passenger cabin 104, of a public transportation vehicle 100, is shown. Row 118D includes a cargo cart 116 that is a third cargo cart 116C, as shown in FIG. 1C. The width $W1_C$ of the third cargo cart 116C is greater than the width W2 of the passenger seat 114, such that the width $W1_C$ is equal to or less than the width of three passenger seats. The length $L1_C$ of the third cargo cart 116C is equal to or less than the length L2 of the passenger seat 114. Accordingly, the third cargo cart 116C fits within the space that could otherwise be occupied by three passenger seats 114. In other examples, row 118E includes one passenger seat 114 and two cargo carts 116, the cargo cart 116 also extend into row 118F. The two cargo carts 116 are a second cargo cart 116B, as shown in FIG. 1B. The length $L1_B$ of the second cargo carts 116B is equal to or less than the width W2 of one passenger seat 114. The width $W1_C$ of the second cargo carts 116B is greater than the length L2 of one passenger seat 114, such that the cargo carts 116B longitudinally span from row 118E to the adjacent row 118F. Accordingly, the second cargo carts 116B fit within the space that could otherwise be occupied by two longitudinally directly adjacent passenger seats 114. Row 118F also includes a first cargo cart 116A, as shown in FIG. 1A.

Particular examples of the public transportation vehicle 100 will now be described with reference to FIG. 5-8.

Figure 5:
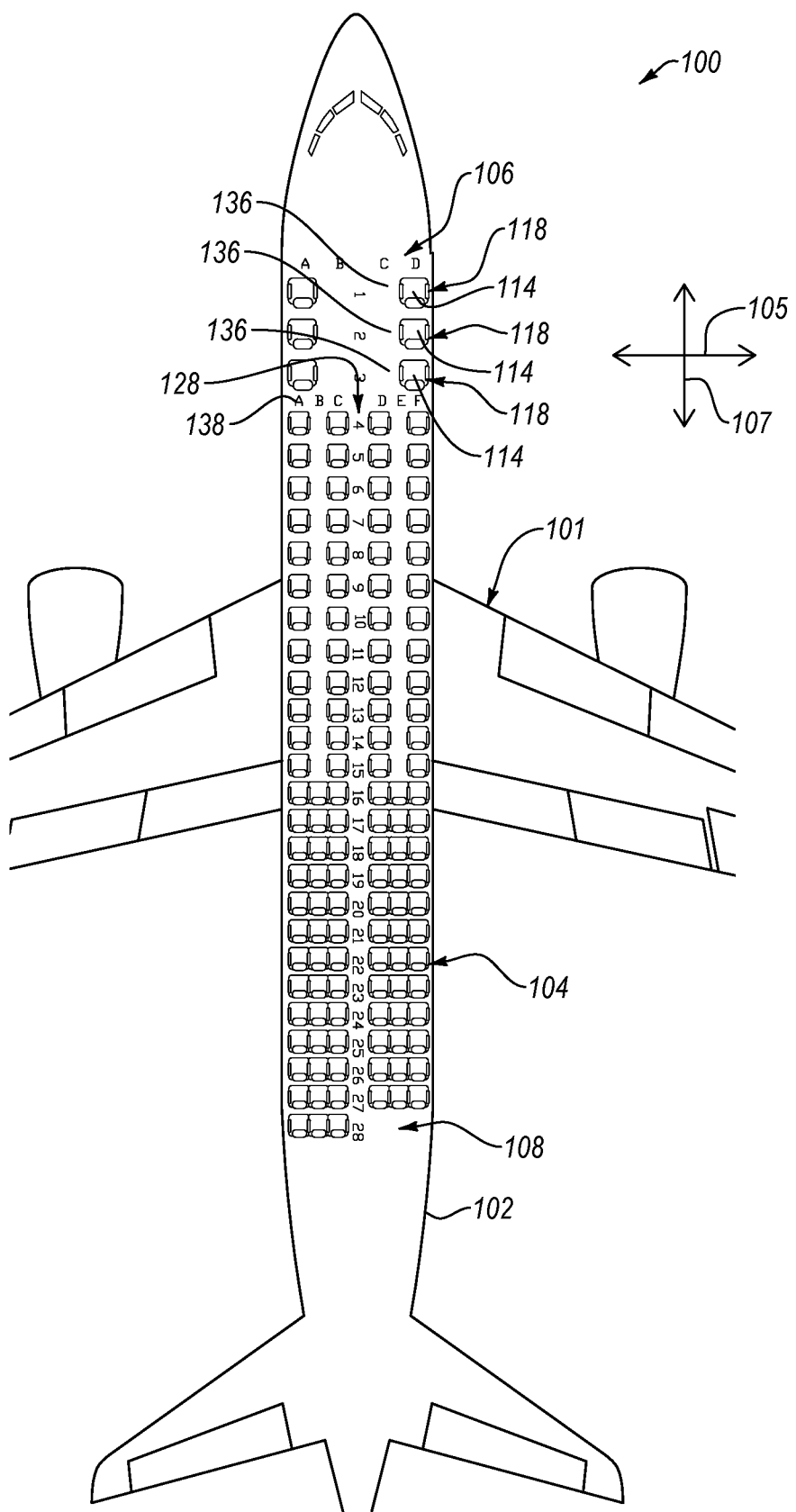
FIG. 5 is a schematic top view of a public transportation vehicle, where the public transportation vehicle has a passenger cabin with a plurality of open spaces within the multiple passenger rows, according to one or more examples of the present disclosure.

Referring to FIG. 5, an aircraft 101 has multiple rows 118, referenced as rows 1-28, within a passenger cabin 104. The multiple rows 118 extend from the front section 106 of the passenger cabin 104 to the back section 108 of the passenger cabin 104, and are spaced apart in the longitudinal direction 105. A plurality of passenger seats 114 are arranged into the multiple rows 118 with some rows 118 of the multiple rows including open spaces 136. Specifically, rows 1-3 each includes one passenger seat 114 laterally directly adjacent to an open space 136 on both sides of the open aisle 128. Rows 4-15 each includes an open space 136 that is laterally directly adjacent to a passenger seat 114 on either side of the open space 136, the pattern repeated on both sides of the open aisle 128. In other words, the open space 136 is interposed between passenger seats 114, such that, as commonly referred to in the art, the middle seat in each row 118 has been removed and is an open space 136. The remainder of the rows 16-28 have passenger seats in each position (i.e., a passenger seat in each column A-F) within the row, such that there are no open spaces 136. Although there may be financial or passenger distancing benefits to having open space 136 within some rows 118, which are configured to be later occupied with a cargo cart 116, it is not necessary that every row 118 has an open space 136, such as rows 16-28.

Figure 6:
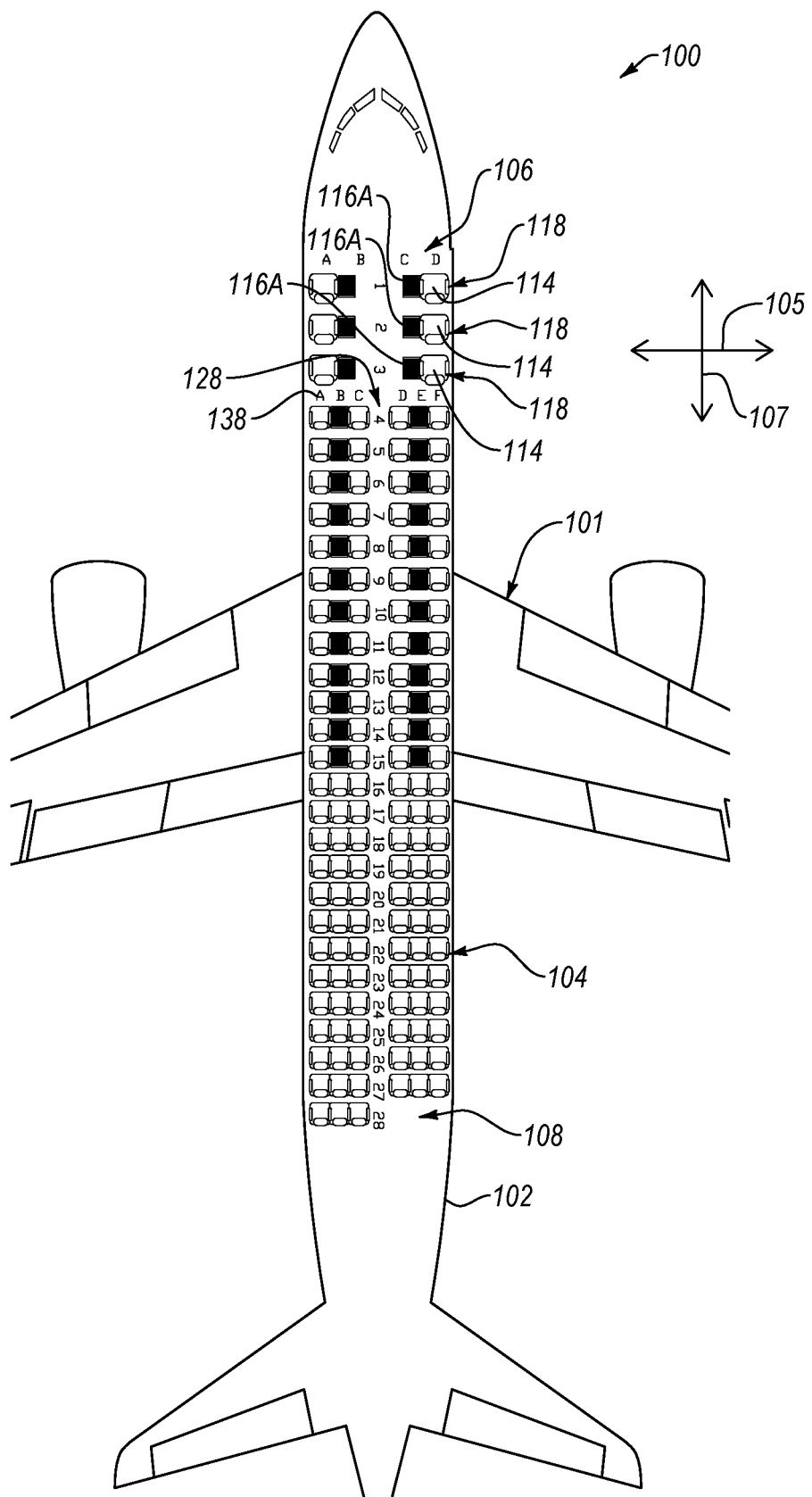
FIG. 6 is a schematic top view of the public transportation vehicle of FIG. 5, where cargo carts are releasably fixed within each previously open space within the multiple passenger rows, according to one or more examples of the present disclosure.

Referring to FIG. 6, each open space 136 in the aircraft 101 of FIG. 5 now has a cargo cart, such as the first cargo cart 116A, releasably fixed within the open space 136. Specifically, the previously open spaces 136 in rows 1-3 have a first cargo cart 116A releasably fixed to one least one seating track 112 that extend below the first cargo cart 116A. Accordingly, the passenger seats 114 in rows 1-3 are each distanced from other passenger seats 114, that is, no passenger seat 114 is laterally directly adjacent to another passenger seat 114. In some cases, a public transportation vehicle 100 may be able to charge a premium fee for a passenger seat 114 that is not laterally directly adjacent to another passenger seat 114, resulting in increased revenue for the public transportation vehicle 100. Due to the first cargo carts 116A in rows 1-3 being positioned next to the open aisle 128, the first cargo carts 116A, when advanced through the passenger cabin 104, can be moved down the open aisle 128 and directly into the corresponding open space 136.

The open spaces 136 in rows 4-15 have a corresponding first cargo cart 116A releasably fixed to at least one seating track 112 that extends below the cargo cart 116A. Accordingly, the passenger seats 114 in rows 4-15 are each distanced from other passenger seats 114 such that each passenger seat 114 is laterally directly adjacent to a first cargo cart 116A or the open aisle 128. Due to the first cargo carts 116A in rows 4-15 being positioned between passenger seats 114, moving the first cargo carts 116 into the corresponding open space 136 may be more difficult to fit into the corresponding open spaces 136 than the first cargo carts 116A in rows 1-3. In some examples, the length L1 of the cargo cart 116A is less than the space between two longitudinally adjacent rows 118, such that the first cargo cart 116A can be moved between the longitudinally adjacent rows and releasable fixed within the corresponding open space 136. However, if the length L1 of the first cargo cart 116A is greater than the space between the two longitudinally adjacent rows 118, the first cargo carts 116A cannot be moved between to the two rows to be positioned with the corresponding open space 136. In this case, one by one, the first cargo carts 116A can be moved down the open aisle 128 to a walkway 138, the walkway 138 with a width that is greater than the length L1 of the first cargo carts 116A. The cargo carts 116A can then be advanced through the open space 136 in each row, starting at row 4 until moved into the corresponding open space 136.

For example, the first cargo cart 116A that corresponds to row 15 would be advanced through the open spaces 136 in rows 4-14 and releasably fixed into row 15. Another first cargo cart 116A could then be advanced, using the same method, into the corresponding open space 136 in row 14. The remaining first cargo carts 116 for rows 4 through 13 would be advanced into the corresponding open spaces 136 in the same manner. Additionally, depending on the configuration of the aircraft 101 and the open spaces 136 within the aircraft 101, loading and advancing of cargo carts 116 in different sections can be done simultaneously with the loading and advancing of other cargo carts 116. For example, the first cargo carts 116A in column B can be added simultaneously with the first cargo carts 116A in column E. Other factors may also be important to consider when loading the cargo carts 116 within the aircraft 101, such as a size, shape, weight and/or delivery location of the cargo carts 116 relative to other cargo carts 116.

In some examples, each cargo cart 116 fixed within the aircraft 101 has the same size and shape as all other cargo carts 116 fixed within the aircraft 101. In other examples, the cargo carts 116 secured within the aircraft 101 may have a variety of sizes and shapes. For example, the first cargo carts 116A in rows 1-3 may have a size approximately equal to one passenger seat 114 in the same rows, which are larger than the passenger seats 114 in rows 4-15. However, the first cargo carts 116A in rows 4-15 may have size that is less than the size of the first cargo cart 116A in row 1-3, as the passenger seats 114 in rows 4-15 are smaller than the passenger seats in rows 1-3.

The cargo carts 116 may be loaded onto the aircraft 101 using existing aircraft systems and infrastructure, such as elevator trucks and other infrastructure commonly used to load catering carts, baggage, or other items on the aircraft 101. In some examples, all of the cargo carts 116 are releasably fixed with the aircraft 101 before any passengers are loaded into the same aircraft 101. In other examples, the passengers and cargo carts 116 may be loaded simultaneously. In yet other examples, the cargo carts 116 are loaded and releasably fixed within the aircraft 101 after the passengers have been loaded into the same aircraft 101.

Figure 7:
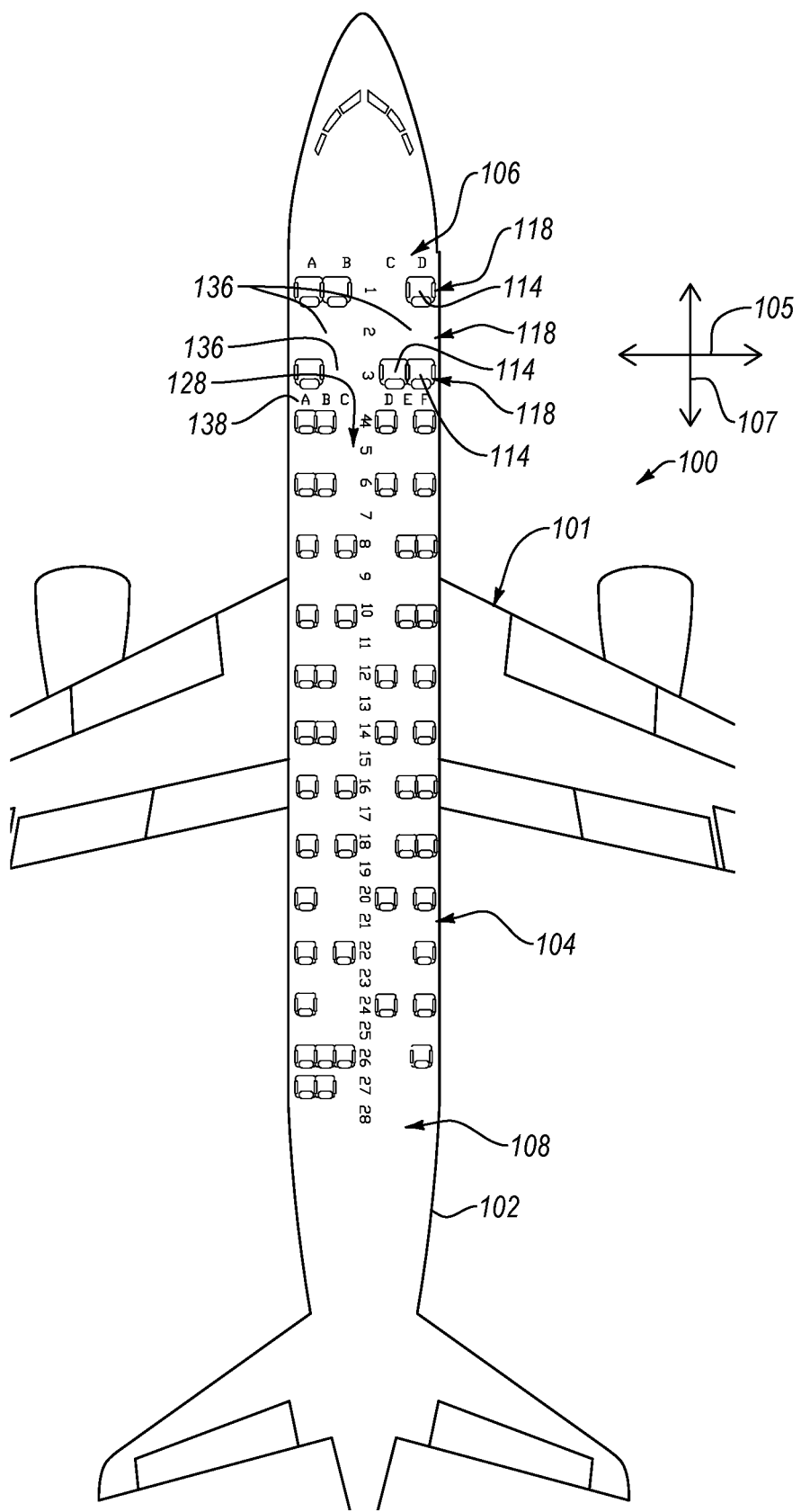
FIG. 7 is a schematic top view of a public transportation vehicle, where the public transportation vehicle has a passenger cabin with a plurality of open spaces within the multiple passenger rows, according to one or more examples of the present disclosure.

Referring to FIG. 7, the aircraft 101 has multiple rows 118, referenced as rows 1-28, within the passenger cabin 104. A plurality of passenger seats 114 are arranged into the multiple rows 118 with some rows 118 of the multiple rows including open spaces 136. In some examples, the open spaces 136 occupy a space that would otherwise be occupied by one passenger seat 114. In other examples, the open spaces 136 occupy a space that would otherwise by occupied by multiple passenger seats 114. Accordingly, as shown, the open spaces 136 may occupy the space of one to three passenger seats 114.

Figure 8:
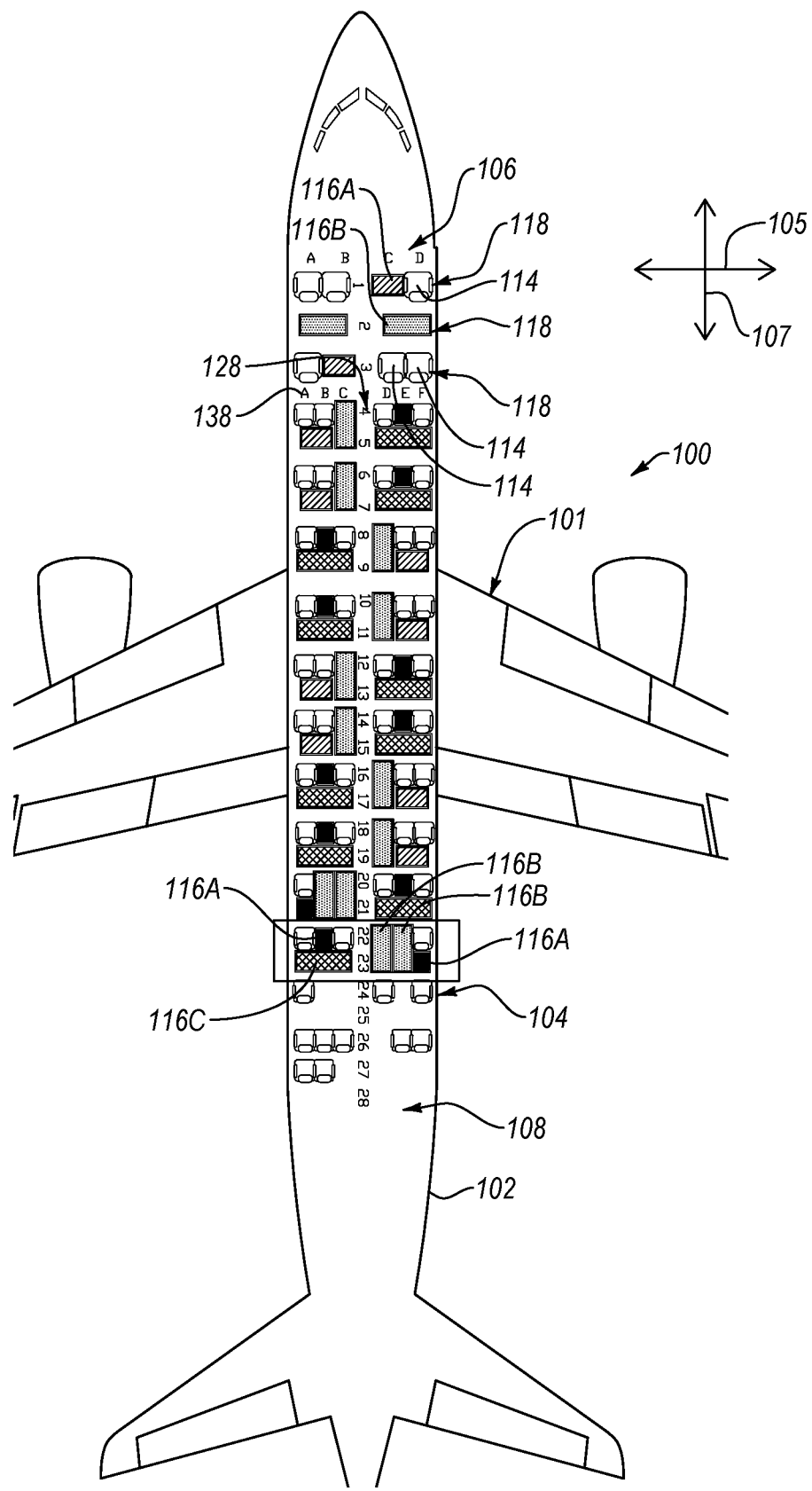
FIG. 8 is a schematic top view of the public transportation vehicle of FIG. 7, where cargo carts are releasably fixed within each previously open space within the multiple passenger rows, the cargo carts having a variety of sizes, according to one or more examples of the present disclosure.

Referring to FIG. 8, each open space 136 in rows 1-23 from the aircraft 101 of FIG. 7 now has at least one cargo cart 116 releasably fixed within each open space 136. This configuration of passenger seats 114 and cargo carts 116 within the passenger cabin 104, separates the passenger seats 114 into groups of single passenger seats, two passenger seats, or three passenger seats. This configuration may be utilized for social distancing of passengers within the passenger cabin 104, as social and/or family units can be distanced from other social and/or family units. The order in which cargo carts 116 are added is important to consider in this configuration, as specific cargo carts 116 must be added before other cargo carts 116 can be added to the passenger cabin 104.

Referring to the boxed section of rows 22 and 23, the cargo carts 116 can be loaded in the following manner. First, the first cargo cart 116A, shown in row 22 column B, is loaded onto the aircraft 101, moved down the open aisle 128, through the open space 128 in row 23, and into the open space in row 22, column B and released fixed to the seating tracks below the first cargo cart 116A. Next, the third cargo cart 116C, shown in row 23, is loaded onto the aircraft 101, moved down the open aisle 128, and rotated into the open space 136 in row 23. Due to the space restrictions of the open aisle 128 and the size of the third cargo cart 116C, the third cargo cart 116C requires additional open space in order to rotate the third cargo cart 116C into position, therefore, requiring other open spaces in rows 22 and 23 during the loading and moving of the third cargo cart 116C. Accordingly, it is necessary that this cargo cart 142 be added to the aircraft 101 before certain other cargo carts 116 so the cargo cart 142 has additional open space available for rotating the cargo cart 142. Third, the first cargo cart 116A, shown in row 23 column F, is loaded onto the aircraft 101, moved down the open aisle 128 and through the open space 128 in row 23 into column E and releasably fixed to the seating tracks below the first cargo cart 116A. Fourth, the second cargo cart 116B, shown in rows 22 and 23 column E, is loaded onto the aircraft 101, moved down the open aisle 128 and through the open spaces in rows 22 and 23 into column E. The second cargo cart 116B extends from row 22 to row 23 and is releasably fixed to the seating tracks below the second cargo cart 116B. Lastly, the second cargo cart 116B, shown in rows 22 and 23 column D, is loaded onto the aircraft 101, moved down the open aisle 128 and moved into the open spaces in rows 22 and 23 in column D. The second cargo cart 116B extends from row 22 to row 23 and is releasably fixed to the seating tracks below the second cargo cart 116B.

It should be understood that the above order of loading cargo carts in the boxed section is for illustration only, and that other loading orders of cargo carts 116 may be possible. Additionally, the loading order, as illustrated above, accounts for the size and shape of the cargo carts 116, however, the weight of individual cargo carts 116 and the delivery location of the cargo items within the cargo carts 116 may also have an effect on the loading order. The loading of the cargo carts 116 on the aircraft 101 can be optimized manually or using specialized software to determine an optimized loading order that takes into account the size, shape, weight and/or delivery location of the cargo carts 116. In some examples, the loading order may take into consideration weight distribution throughout the passenger cabin 104, such as equal weight distribution of passengers and/or cargo carts 116 on each side of the aisle of the passenger cabin 104 and/or weight distribution in the longitudinal direction 105 along the passenger cabin 104 (i.e. weight distribution from the front to the back of the passenger cabin 104).

Figure 9:
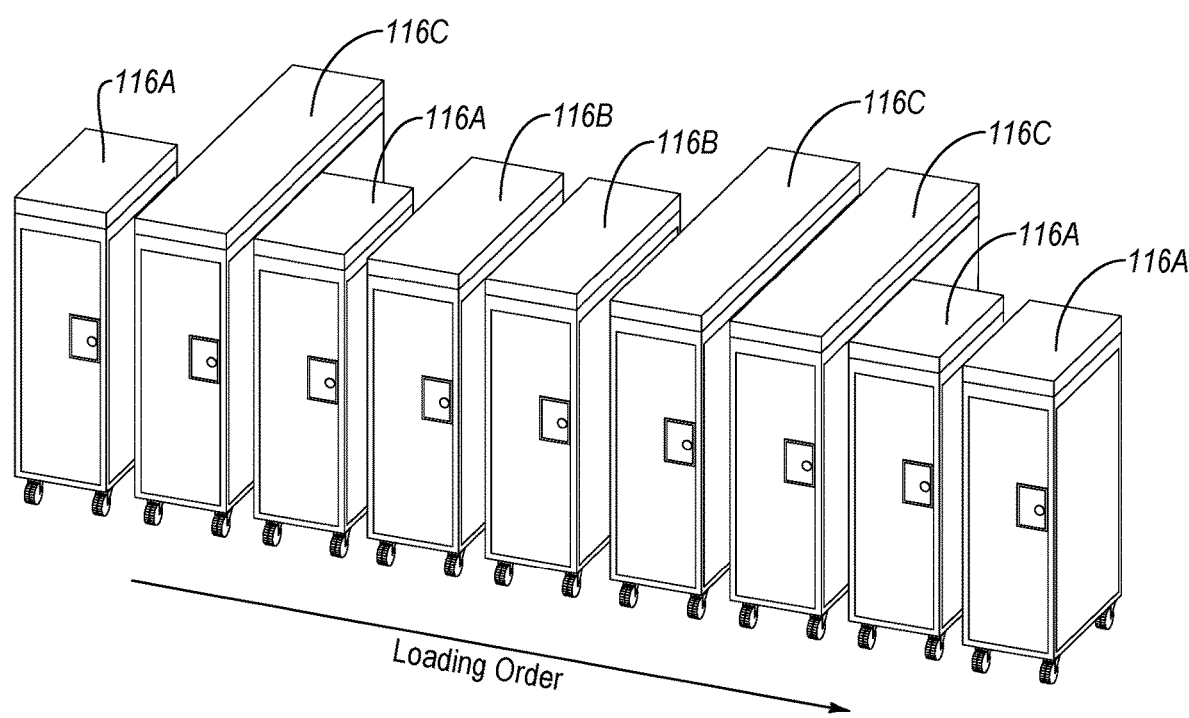
FIG. 9 is a schematic perspective view of a plurality of cargo carts arranged in an optimized loading order, outside of a public transportation vehicle, according to one or more examples of the present disclosure.

Referring to FIG. 9, the cargo carts 116, corresponding to rows 24-28, are arranged in an optimized loading order, outside of the aircraft, prior to be loading within the aircraft 101 of FIG. 8. The cargo carts 116 are arranged into a loading order that takes into account at least one of a size, weight, shape or delivery location of the cargo carts 116 in reference to the other cargo carts 116. For example, the cargo carts 116 may be arranged in a loading order according the size of the cargo carts 116, such that the first cargo cart 116 in the loading order will be the first loaded into the aircraft 101. One example of an optimized loading order based on the size of the cargo carts 116 is shown in FIG. 9. The first cargo cart 116 in the loading order is a first cargo cart 116A, which will be advanced into row 24 column E. Next, a third cargo cart 116C will be advanced into row 25. Third, a first cargo cart 116A will be advanced into row 25 column A. Fourth, a second cargo cart 116B will be advanced into rows 24 and 25 column B. Fifth, a second cargo cart 116B will be advanced into rows 24 and 25 column B. Sixth, a third cargo cart 116C will be advanced into row 27. Seventh, a third cargo cart 116C will be advanced into row 28. Eighth, a first cargo cart 116A will be advanced into row 26. Lastly, a first cargo cart 116A will be advanced into row 27. In other examples, the weight and/or delivery location of the cargo carts 116 are also taken into account when arranging the cargo carts 116 in an optimized loading order.

Figure 10:
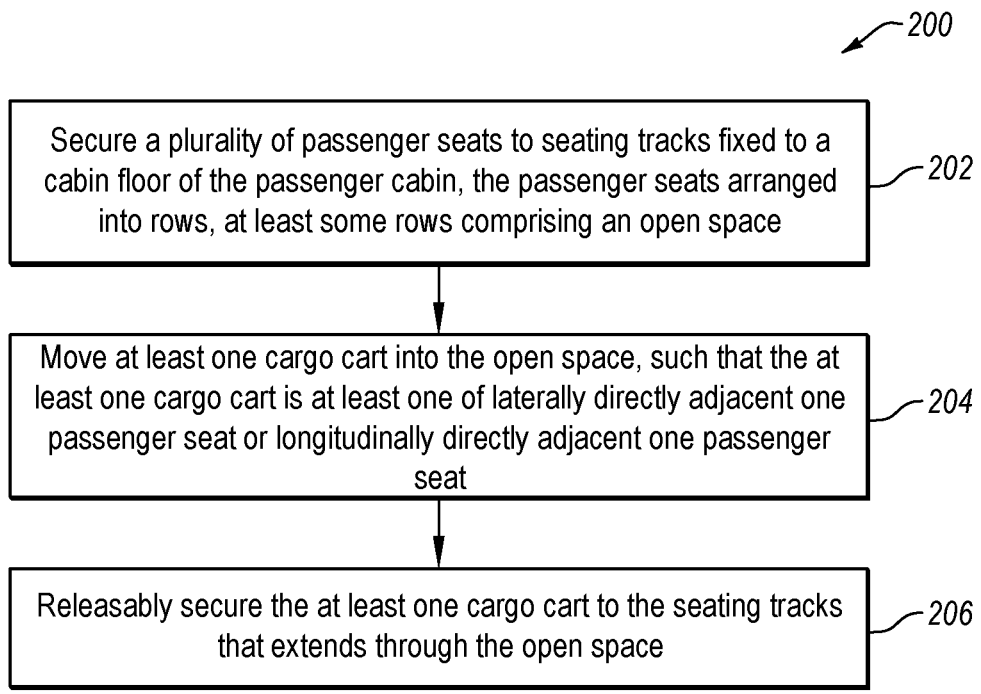
FIG. 10 is a schematic flow diagram of a method of occupying a passenger cabin of a public transportation vehicle with mixed passenger seating and cargo storage, according to one or more examples of the present disclosure.

Referring to FIG. 10, according to certain examples, a method 200 for occupying a passenger cabin 104 of a public transportation vehicle 100 with mixed passenger seating and cargo storage is shown. The method 200 is performed using any one or more of the examples of the public transportation vehicle 100 disclosed herein. The method 200 includes (block 202) securing a plurality of passenger seats 114 to seating tracks 112 fixed to a cabin floor 110 of the passenger cabin 104. The plurality of passenger seats 114 are arranged into at least some rows 118 of multiple rows 118 of the passenger cabin 104 that are spaced apart in the longitudinal direction 105 from the front section 106 to the back section 108 of the passenger cabin 104. At least one row 118 of the multiple rows 118 includes an open space 136 through which at least one of the seating tracks 112 extends. The method 200 also includes (block 204) moving at least one cargo cart 116 into the open space 136, such that the at least one cargo cart 116 is at least one of laterally directly adjacent one of the plurality of passenger seats 114 in a lateral direction 107, that is perpendicular to the longitudinal direction 105, to form one of the multiple rows 118 with the laterally directly adjacent one of the plurality of passenger seats 114 or longitudinally directly adjacent one of the plurality of passenger seats 114 in the longitudinal direction 105, to form a column 119 with the longitudinally directly adjacent one of the plurality of passenger seats 114. The method 200 further includes (block 206) releasably securing 206 the at least one cargo cart 116 to the at least one of the seating tracks 112 that extends through the open space 136.

In some examples, the method further includes releasably securing secondary attachment portions 122 on the at least one cargo cart 116 to corresponding attachment portions 123 in a laterally directly adjacent vertical surface 126. The vertical surface 126 extends upwardly from the cabin floor 110.

Figure 11:
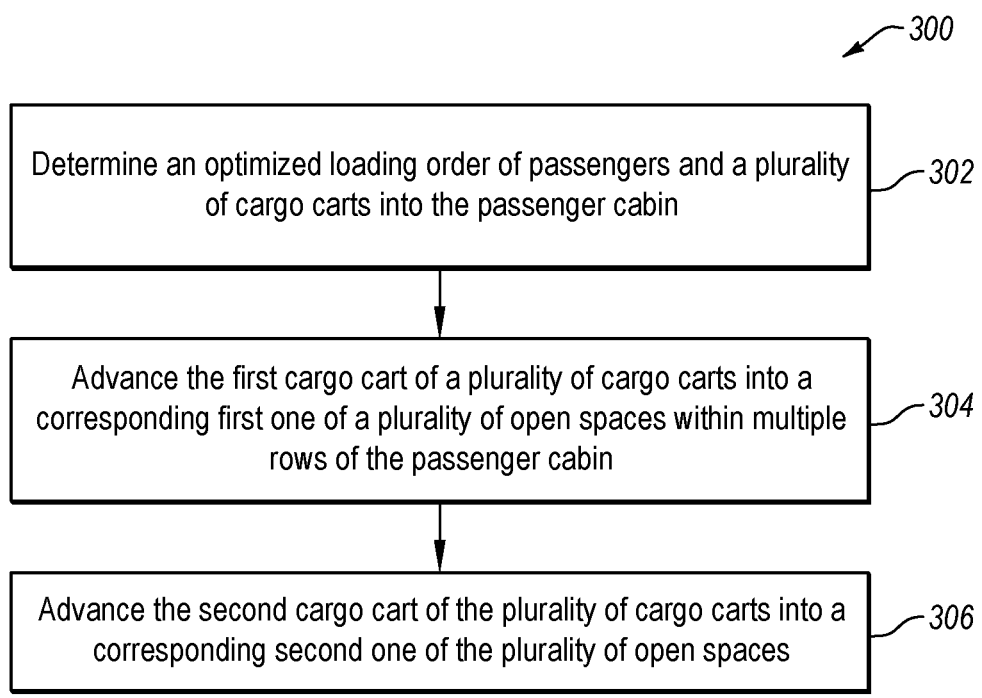
FIG. 11 is a schematic flow diagram of a method of optimizing loading of a passenger cabin of a public transportation vehicle with mixed passenger seating and cargo storage, according to one or more examples of the present disclosure.

Now referring to FIG. 11, according to certain examples, a method 300 for optimizing the loading of a passenger cabin 104 of a public transportation vehicle 100 with mixed passenger seating and cargo storage is shown. Similar to method 200, the method 300 is performed using any one or more of the examples of the public transportation vehicle 100 disclosed herein. The method includes (block 302) determining an optimized loading order of passengers and a plurality of cargo carts 116 into the passenger cabin 104. The optimized loading order includes loading a first cargo cart of a plurality of cargo carts 116 before loading a second cargo cart of the plurality of cargo carts 116 based on at least one of a size, weight, shape or delivery location of the first cargo cart relative to the second cargo cart. The method 300 also includes (block 304) advancing the first cargo cart of a plurality of cargo carts 116 into a corresponding first one of a plurality of open spaces 136 within multiple rows 118 of the passenger cabin 104. The multiple rows are spaced apart in a longitudinal direction 105 along a cabin floor 110 of the passenger cabin 104. At least some rows 118 of the multiple rows 118 include a plurality of passenger seats 114. Each open space 136 of the plurality of open spaces 136 is at least one of laterally directly adjacent one of the plurality of passenger seats 114 in a lateral direction 107 that is perpendicular to the longitudinal direction 105 to form one of the multiple rows 118 with the laterally directly adjacent one of the plurality of passenger seats 114 or longitudinally directly adjacent one of the plurality of passenger seats 114 in the longitudinal direction 105, to form a column 119 with the longitudinally directly adjacent one of the plurality of passenger seats 114. After advancing the first cargo cart into the corresponding first one of the plurality of open spaces 136, the method 300 further includes (block 306) advancing the second cargo cart of the plurality of cargo carts 116 into a corresponding second one of the plurality of open spaces 136.

In some examples, the method 300 further includes releasably securing the first cargo cart to at least one of a plurality of seating tracks 112 that extends through the corresponding first one of the plurality of open spaces 136. The plurality of seating tracks 112 are fixed to the cabin floor 110 of the passenger cabin 104. The method also includes releasably securing the second cargo cart to at least one of the seating tracks 112 that extends through the corresponding second one of the plurality of open spaces 136.

The method may further include, in some examples, arranging each cargo cart 116 of the plurality of cargo carts 116 in an order, corresponding with the optimized loading order of passengers and the plurality of cargo carts 116 into the passenger cabin 104, prior to advancing any one of the plurality of cargo carts 116 into the passenger cabin 104.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A public transportation vehicle, comprising:
   a passenger cabin, comprising a cabin floor that extends, in a longitudinal direction, from a front section of the passenger cabin to a back section of the passenger cabin;
   a plurality of seating tracks, fixed to the cabin floor at locations along the passenger cabin;
   a plurality of passenger seats, arranged into multiple rows spaced apart in the longitudinal direction, wherein each passenger seat of the plurality of passenger seats is selectively releasably fixed to at least one seating track of the plurality of seating tracks, and wherein a portion of the multiple rows comprises at least one seatless space, such that a plurality of seatless spaces are interspersed with the plurality of passenger seats throughout the passenger cabin; and
   a plurality of cargo carts, selectively releasably fixable to at least one seating track of the plurality of seating tracks and each one of the plurality of cargo carts is positioned within a corresponding one of the plurality of seatless spaces such that, when the plurality of cargo carts are selectively releasably fixed to the at least one seating track of the plurality of seating tracks and positioned within the plurality of seatless spaces, each one of the plurality of cargo carts is at least one of:
   laterally directly adjacent one of the plurality of passenger seats in a lateral direction, perpendicular to the longitudinal direction, to form one of the multiple rows with the at least one of the laterally directly adjacent one of the plurality of passenger seats; or
   longitudinally directly adjacent one of the plurality of passenger seats in the longitudinal direction, to form a column with the longitudinally directly adjacent one of the plurality of passenger seats.

2. The public transportation vehicle of claim 1, wherein:
   when the plurality of cargo carts are selectively releasably fixed to the at least one seating track of the plurality of seating tracks, at least one of the plurality of cargo carts is laterally directly adjacent one of the plurality of passenger seats on a first side of the at least one of the plurality of cargo carts and laterally directly adjacent another one of the plurality of passenger seats on a second side of the at least one of the plurality of cargo carts; and
   the first side of the at least one of the plurality of cargo carts is opposite the second side of the at least one of the plurality of cargo carts.

3. The public transportation vehicle of claim 1, wherein:
   when the plurality of cargo carts are selectively releasably fixed to the at least one seating track of the plurality of seating tracks, at least one of the plurality of cargo carts is laterally directly adjacent one of the plurality of passenger seats on a first side of the at least one of the plurality of cargo carts and laterally directly adjacent a cabin wall, of the passenger cabin, on a second side of the at least one of the plurality of cargo carts; and
   the first side of the at least one of the plurality of cargo carts is opposite the second side of the at least one of the plurality of cargo carts.

4. The public transportation vehicle of claim 1, wherein:
   an open aisle extends in the longitudinal direction, from the front section of the passenger cabin to the back section of the passenger cabin;
   the plurality of passenger seats are arranged into multiple rows on each side of the open aisle;

when the at least one of the plurality of cargo carts is selectively releasably fixed to the at least one seating track of the plurality of seating tracks, at least one of the plurality of cargo carts is laterally directly adjacent one of the plurality of passenger seats on a first side of the at least one plurality of cargo carts and laterally directly adjacent the open aisle on a second side of the at least one plurality of cargo carts; and the first side of the at least one plurality of cargo carts is opposite the second side of the at least one plurality of cargo carts.

5. The public transportation vehicle of claim 1, wherein:

an open aisle extends in the longitudinal direction, from the front section of the passenger cabin to the back section of the passenger cabin;

the plurality of passenger seats are arranged into multiple rows on each longitudinal side of the open aisle;

when the at least one of the plurality of cargo carts is selectively releasably fixed to the at least one seating track of the plurality of seating tracks, at least one plurality of cargo carts is laterally directly adjacent a cabin wall on a first side of the at least one of the plurality of cargo carts and laterally directly adjacent the open aisle on a second side of the at least one of the plurality of cargo carts; and the first side of the at least one of the plurality of cargo carts cargo cart is opposite the second side of the at least one of the plurality of cargo carts.

6. The public transportation vehicle of claim 1, wherein, when the at least one of the plurality of cargo carts is selectively releasably fixed to the at least one seating track of the plurality of seating tracks, the at least one of the plurality of cargo carts is longitudinally directly adjacent one of the plurality of passenger seats in the longitudinal direction, and the at least one of the plurality of cargo carts extends from a first one of the multiple rows to a second one of the multiple rows that is longitudinally directly adjacent the first one of the multiple rows.

7. The public transportation vehicle of claim 1, wherein:

at least one of the plurality of cargo carts has a first width, in the lateral direction, when the at least one of the plurality of cargo carts is selectively releasably fixed to the at least one seating track;

each passenger seat of the plurality of passenger seats has a second width in the lateral direction; and the first width is the same as or less than the second width.

8. The public transportation vehicle of claim 1, wherein:

at least one of the plurality of cargo carts has a first width, in the lateral direction, when the at least one of the plurality of cargo carts is selectively releasably fixed to the at least one seating track;

each passenger seat of the plurality of passenger seats has a second width in the lateral direction; and the first width is greater than the second width.

9. The public transportation vehicle of claim 1, wherein:

at least one of the plurality of cargo carts has a first length, in the longitudinal direction, when the at least one of the plurality of cargo carts is selectively releasably fixed to the at least one seating track;

each passenger seat of the plurality of passenger seats has a second length in the longitudinal direction; and the first length is the same or less than the second length.

10. The public transportation vehicle of claim 1, wherein:

at least one of the plurality of cargo carts has a first length, in the longitudinal direction, when the at least one of the plurality of cargo carts is selectively releasably fixed to the at least one seating track;

each passenger seat of the plurality of passenger seats has a second length in the longitudinal direction; and the first length is greater than the second length, such that the at least one of the plurality of cargo carts extends from a first one of the multiple rows into a second one of the multiple rows that is longitudinally directly adjacent the first one of the multiple rows.

11. The public transportation vehicle of claim 1, wherein:

at least one of the plurality of cargo carts has a first size;

at least another one of the plurality of cargo carts has a second size; and the first size is different than the second size.

12. The public transportation vehicle of claim 11, wherein:

at least one of the plurality of cargo carts has a third size; and the third size is different than the first size and the second size.

13. The public transportation vehicle of claim 1, wherein each one of the plurality of cargo carts further comprises:

rollers attached to an underside of the cargo cart, the rollers rollable along the cabin floor;

an interior compartment configured to conceal cargo items; and a door, movably coupled relative to the interior compartment, such that the door is openable to provide access to the interior compartment and closable to restrict access to the interior compartment.

14. The public transportation vehicle of claim 1, further comprising at least one wall partition, pivotably fixable relative to the cabin floor such that the at least one wall partition extends vertical upwardly perpendicular to the cabin floor, wherein, when the at least one wall partition is pivotably fixed relative to the cabin floor, the at least one wall partition is laterally directly adjacent to one side of at least one of the plurality of cargo carts and interposed between the at least one of the plurality of cargo carts and at least one of an open aisle that is laterally directly adjacent the at least one of the plurality of cargo carts or one of the plurality of passenger seats that is laterally directly adjacent the at least one of the plurality of cargo carts.

15. The public transportation vehicle of claim 1, wherein at least one of the plurality of cargo carts separates at least one of the plurality of passenger seats from all others of the plurality of passenger seats.

16. A method of occupying a passenger cabin of a public transportation vehicle with mixed passenger seating and cargo storage, the method comprising:

securing a plurality of passenger seats to seating tracks fixed to a cabin floor of the passenger cabin, wherein:

the plurality of passenger seats are arranged into multiple rows of the passenger cabin spaced apart in a longitudinal direction from a front section to a back section of the passenger cabin; and a portion of the multiple rows comprising at least one seatless space through which at least one of the seating tracks extends, such that a plurality of seatless spaces are interspersed with the plurality of passenger seats throughout the passenger cabin;

moving each one of a plurality of cargo carts into a corresponding one of the plurality of seatless spaces, such that each one of the plurality of cargo carts is at least one of:

laterally directly adjacent one of the plurality of passenger seats in a lateral direction, perpendicular to the longitudinal direction, to form one of the multiple rows with the laterally directly adjacent one of the plurality of passenger seats; or longitudinally directly adjacent one of the plurality of passenger seats in the longitudinal direction, to form a column with the longitudinally directly adjacent one of the plurality of passenger seats; and releasably securing each one of the plurality of cargo carts to the at least one of the seating tracks that extends through the corresponding one of the plurality of seatless spaces.

17. The method of claim 16, further comprising releasably securing secondary attachment portions on each one of the plurality of cargo carts to corresponding attachment portions in a laterally directly adjacent vertical surface, the vertical surface extending upwardly from the cabin floor.

18. A method of optimizing loading of a passenger cabin of a public transportation vehicle with mixed passenger seating and cargo storage, the method comprising:

determining an optimized loading order of passengers and a plurality of cargo carts into the passenger cabin, wherein the optimized loading order comprises loading a first cargo cart of a plurality of cargo carts before loading a second cargo cart of the plurality of cargo carts based on at least one of a size, weight, shape or delivery location, of the first cargo cart relative to the second cargo cart;

advancing the first cargo cart of a plurality of cargo carts into a corresponding first one of a plurality of seatless spaces within multiple rows of the passenger cabin, spaced apart in a longitudinal direction along a cabin floor of the passenger cabin, at least some rows of the multiple rows comprising at least one of a plurality of passenger seats interspersed with the plurality of seatless spaces throughout the passenger cabin, wherein each one of the plurality of seatless spaces is at least one of:

laterally directly adjacent one of the plurality of passenger seats in a lateral direction, perpendicular to the longitudinal direction, to form one of the multiple rows with the laterally directly adjacent one of the plurality of passenger seats; or longitudinally directly adjacent one of the plurality of passenger seats in the longitudinal direction, to form a column with the longitudinally directly adjacent one of the plurality of passenger seats; and after advancing the first cargo cart into the corresponding first one of the plurality of seatless spaces, advancing the second cargo cart of the plurality of cargo carts into a corresponding second one of the plurality of seatless spaces.

19. The method of claim 18, further comprising:

releasably securing the first cargo cart to at least one of a plurality of seating tracks that extends through the corresponding first one of the plurality of seatless spaces, the plurality of seating tracks fixed to the cabin floor of the passenger cabin; and releasably securing the second cargo cart to at least one of the seating tracks that extends through the corresponding second one of the plurality of seatless spaces.

20. The method of claim 18, further comprising arranging each cargo cart of the plurality of cargo carts in an order, corresponding with the optimized loading order of passengers and the plurality of cargo carts into the passenger cabin, prior to advancing any one of the plurality of cargo carts into the passenger cabin.

\* \* \* \* \*